(12) United States Patent
Ishikawa et al.

(10) Patent No.: US 7,354,671 B2
(45) Date of Patent: Apr. 8, 2008

(54) FUEL CELL SYSTEM HAVING SECONDARY CELL

(75) Inventors: Tetsuhiro Ishikawa, Nishikamo-gun (JP); Tsuyoshi Yano, Toyota (JP); Tadaichi Matsumoto, Okazaki (JP); Katsuhiko Nishiyama, Chiryu (JP); Hiroshi Yoshida, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 31 days.

(21) Appl. No.: 11/151,540

(22) Filed: Jun. 14, 2005

(65) Prior Publication Data

US 2005/0233192 A1    Oct. 20, 2005

Related U.S. Application Data

(63) Continuation of application No. PCT/JP03/015498, filed on Dec. 3, 2003.

(30) Foreign Application Priority Data

Dec. 16, 2002    (JP)    ............... 2002-363251

(51) Int. Cl.
*H01M 8/04* (2006.01)
*H01M 8/00* (2006.01)
*H01M 12/00* (2006.01)

(52) U.S. Cl. .............. 429/23; 429/9; 429/13; 429/22

(58) Field of Classification Search ............ None
See application file for complete search history.

(56) References Cited

U.S. PATENT DOCUMENTS 4,670,702 A    6/1987  Yamada et al.
6,777,909 B1 *  8/2004  Aberle et al. .......... 320/104

2003/0022031 A1 *  1/2003  Manery ............... 429/7

FOREIGN PATENT DOCUMENTS

DE    199 54 306 A1    11/1999

(Continued)

OTHER PUBLICATIONS

Copy of Preliminary Examination Report dated Aug. 25, 2005.
German Language Version of German Office Action for Appln. No. 103 93 874.5-45, dated Sep. 19, 2006.
English Translation of German Office Action for Appln. No. 103 93 874.5-45, Sep. 19, 2006.

*Primary Examiner*—Dah Wei Yuan
*Assistant Examiner*—Karie O'Neill
(74) *Attorney, Agent, or Firm*—Kenyon & Kenyon LLP

(57) ABSTRACT

This invention provides a power supply system for supplying electrical power to a load. The system includes: a first and a second power supply wirings for a connection to the load; a fuel cell system having a fuel cell connected between the first and second power supply wiring; a secondary power supply system connected in parallel to the fuel cell between the first power supply wiring and the second power supply wiring; a switch for opening and closing the connection between the fuel cell and the first power supply wiring; a countercurrent prevention device connected between the fuel cell and the first power supply wiring; and a controller for controlling the secondary power supply system and the switch. The controller controls the secondary power supply system to boost a terminal voltage of the secondary power supply system to a first voltage, when connecting the fuel cell to the first power supply wiring. The first voltage is equal or higher than an electrical potential difference of the open terminals of the fuel cell.

9 Claims, 19 Drawing Sheets

FOREIGN PATENT DOCUMENTS

| | | | |
|---|---|---|---|
| DE | WO 0134424 A * | 5/2001 | |
| JP | 09-171831 | 6/1997 | |
| JP | 09-298806 | 11/1997 | |
| JP | 2001-204106 A | 7/2001 | |
| JP | 2001-229943 A * | 8/2001 | |
| JP | 2001-229950 | 8/2001 | |
| JP | 2001-229950 A | 8/2001 | |
| JP | 2001229943 A * | 8/2001 | |
| JP | 2002-118979 | 4/2002 | |
| JP | 2002-118979 A | 4/2002 | |
| JP | 2002-334712 | 11/2002 | |
| JP | 2002-334712 A | 11/2002 | |
| JP | 2003-197229 A | 7/2003 | |
| JP | 2003-203663 A | 7/2003 | |
| JP | 2003-304606 | 10/2003 | |

* cited by examiner

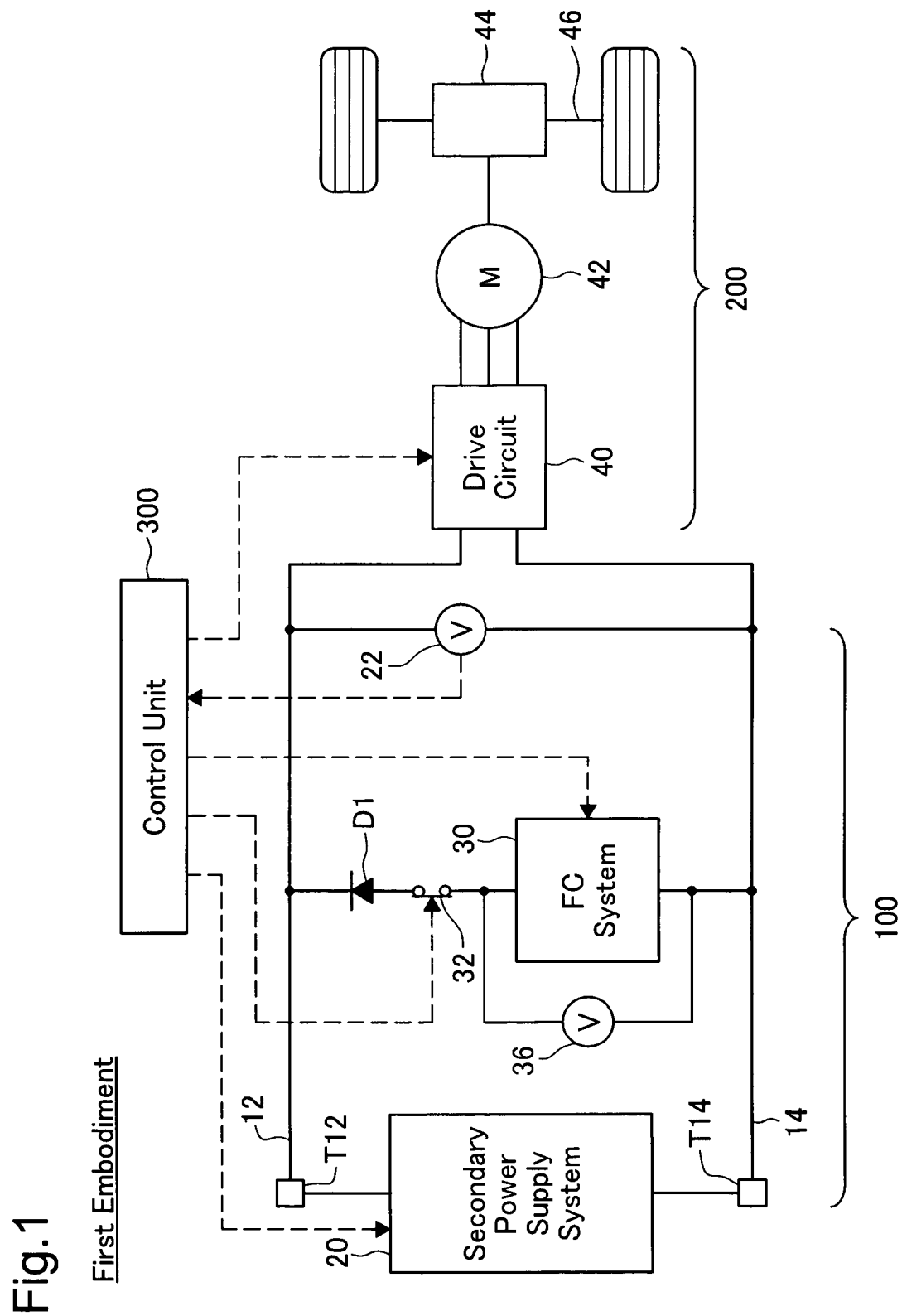
Fig.1 First Embodiment

Case where Drive Circuit Requesting Power > FC Power

Case where Drive Circuit Requesting Power < FC Power

Relationship between FC Voltage and FC Current

Shared Power Burden of FC System and Secondary Power Supply System

Relationship between Input/Output Voltage Ratio and Conversion Efficiency

DC-DC Converter Circuit Operation Status at Time T10

DC-DC Converter Circuit Operation Status at Time T11

FC System Output Halt Operation Status

Switch Timing Chart (During FC System Output Halt)

FUEL CELL SYSTEM HAVING SECONDARY CELL

This is a continuation of International Application No. PCT/JP2003/015498 filled 03 Dec. 2003, claiming priority to Japanese Application No. 2002-363251 filed 16 Dec. 2002, the contents of which are incorporated herein by reference.

TECHNICAL FIELD

The present invention relates to a power supply system comprising a fuel cell and a secondary cell.

BACKGROUND ART

Fuel cells are noted as an environmentally friendly, clean power source. Typically, there are instances in which it is difficult to deal with load fluctuations with a single fuel cell, so there has been proposed a hybrid power supply system which combines a fuel cell and a secondary cell. With a hybrid power supply system, in specific conditions, namely, during fuel cell malfunction or startup, it is desirable to halt output by the fuel cell and supply power with only power from the secondary cell.

However, within a hybrid power supply system there was required a large-capacity switch in order to isolate the fuel cell from the system. Further, during connection of the fuel cell to the system, there occurred the problem of the possibility of excessive current flow from the fuel cell.

DISCLOSURE OF THE INVENTION

The present invention is intended to solve the aforementioned problems of the prior art, and has as an object to provide a technology for realizing, in a power supply system which combines a fuel cell and a secondary cell, an operating mode whereby power is supplied by the secondary cell only.

The present invention provides a power supply system for supplying electrical power to a load. The power supply system includes: a first power supply wiring and a second power supply wiring for a connection to the load; a fuel cell system having a fuel cell connected between the first power supply wiring and the second power supply wiring; a secondary power supply system connected in parallel to the fuel cell between the first power supply wiring and the second power supply wiring; a switch for opening and closing the connection between the fuel cell and the first power supply wiring; a countercurrent prevention device connected between the fuel cell and the first power supply wiring; and a controller for controlling the secondary power supply system and the switch. The controller is configured to control the secondary power supply system to boost a terminal voltage of the secondary power supply system to a first voltage, when connecting the fuel cell to the first power supply wiring, the first voltage being equal or higher than an electrical potential difference of the open terminals of the fuel cell.

According to the power supply system of the present invention, when connecting the fuel cell to the power supply system, current flowing from the fuel cell can be brought to zero, so terminal voltage of the secondary power supply system after connection gradually drops, whereby output current from the fuel cell can be slowly increased.

It is possible to realize the invention in various configurations, for example, a hybrid power supply system and a control device and control method for same; a moving body (e.g. a fuel cell automobile) equipped with such a system, and a control method for same; a computer program for realizing the functions of such a system or method; a recording medium having such a computer program recorded thereon; a data signal including such a computer program embodied in a carrier wave; a power supply method; or other such configuration.

BRIEF DESCRIPTION OF THE DRAWINGS

FIG. 1 is a simplified schematic diagram of an electric car equipped with a power supply system as the first embodiment of the invention.

FIG. 19 is a graph representing a constant power discharge curve of a secondary cell 23a.

BEST MODE FOR CARRYING OUT THE INVENTION

Figure 2A:
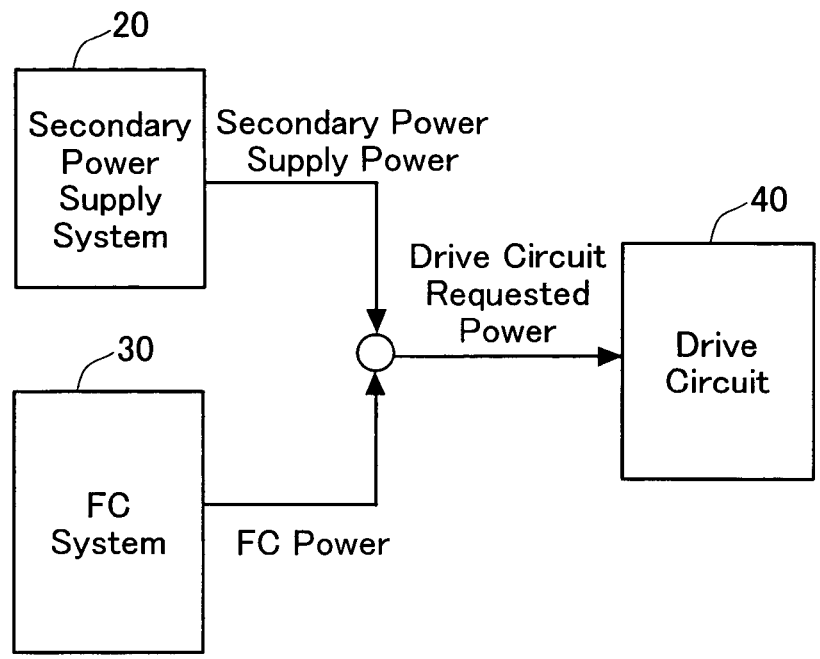
FIGS. 2(A) and 2(B) are block diagrams showing a secondary power supply system 20 and an FC system 30 supplying power to a motor drive circuit 40.

The embodiments of the invention shall be described hereinbelow on the basis of Embodiments, in the following order.

A. Arrangement of Hybrid Power Supply System in the first embodiment of the Invention:
B. Operation of Hybrid Power Supply System in the first embodiment of the Invention:
C. Arrangement of Hybrid Power Supply System in the second embodiment of the Invention:
D. Operation of Hybrid Power Supply System in the second embodiment of the Invention:

A. Arrangement of Hybrid Power Supply System in the First Embodiment of the Invention:

FIG. 1 is a simplified schematic diagram of an electric car equipped with a power supply system as the first embodiment of the invention. This electric car (hereinafter termed simply "vehicle system") comprises a hybrid power supply system 100, a load 200 that includes the wheels, and a control unit 300. The hybrid power supply system 100 has a second power supply system 20 and a fuel cell system 30 (also refereed to as "FC system") connected in parallel to one another between two power supply wirings 12, 14. Two voltmeters 22, 36 for measuring terminal voltage are provided respectively to the second power supply system 20 and the fuel cell system 30. Between the fuel cell system 30 and the first power supply wiring 12 are series-connected an FC switch 32 and a countercurrent preventing diode D1.

The power supply wirings 12, 14 are connected to the motor drive circuit 40 of the load 200. The motor drive circuit 40 is a circuit for driving a motor 42, and is composed of a transistor inverter, for example. Motive power generated by the motor 42 is transmitted to the wheel drive shaft 46 via a gear mechanism 44.

The control unit 300 is electrically connected to the FC system 30, the FC switch 32, and the motor drive circuit 40, and executes various types of control including control of these circuits. The control operations of the control unit 300 are realized by means of a computer program stored in memory (not shown) built into the control unit 300, and executed by the control unit 300. As this memory, it would be possible to utilize ROM, a hard disk, or various other recording medium.

The motor drive circuit 40 converts DC power supplied from the hybrid power supply system 100 into three phase AC power supplied to the motor 42. The magnitude of the three phase AC power supplied is determined by the motor drive circuit 40 controlled by the control unit 300, depending on input from the accelerator, not shown. In this way, there is constituted a vehicle system whereby the magnitude of the three phase AC power supplied to the motor 42 is not dependent upon the output voltage of the hybrid power supply system 100.

Figure 2B:
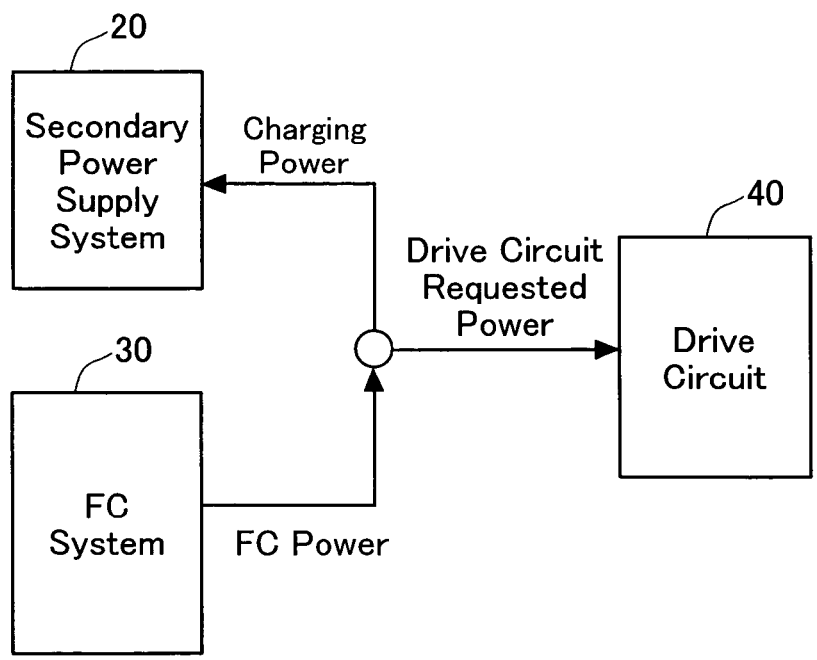

FIGS. 2(A) and 2(B) are block diagrams showing the secondary power supply system 20 and the FC system 30 supplying power to the motor drive circuit 40. FIG. 2(a) shows the case where the requested power of the motor drive circuit 40 is greater than the FC voltage which is the output voltage of the FC system 30; and FIG. 2(b) shows the case where the requested power of the motor drive circuit 40 is less than the FC voltage.

Where the drive circuit requested power of the motor drive circuit 40 is greater than the FC voltage, both the FC system 30 and the secondary power supply system 20 simultaneously supply power to the motor drive circuit 40 (FIG. 2(a)). For example, when the accelerator (not shown) is depressed and the drive circuit requested power has momentarily become high, both the FC system 30 and the secondary power supply system 20 supply power.

Where the drive circuit requested power of the motor drive circuit 40 is less than the FC voltage, the extra power in the FC power is supplied to the secondary power supply system 20 and charges the secondary power supply system 20 described later (FIG. 2(b)). For example, when the drive circuit requested power has momentarily become low during idling, the FC system 30 supplies power to both the motor drive circuit 40 and the secondary power supply system 20.

When power is supplied from the motor drive circuit 40 by means of regenerative braking of the motor 42, that power is supplied to the secondary power supply system 200 only. A countercurrent preventing diode D1 for protecting the FC system 30 is disposed between the FC system 20 and the power supply wiring 12 (FIG. 1).

Figure 3A:
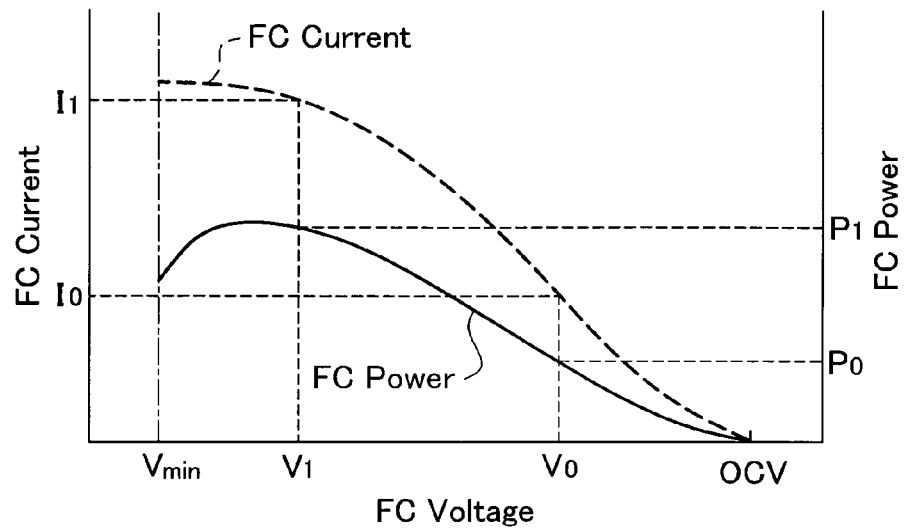
FIGS. 3(A) and 3(B) are illustrations showing variation of sharing rate due to control of output voltage of the secondary power supply system.
Figure 3B:
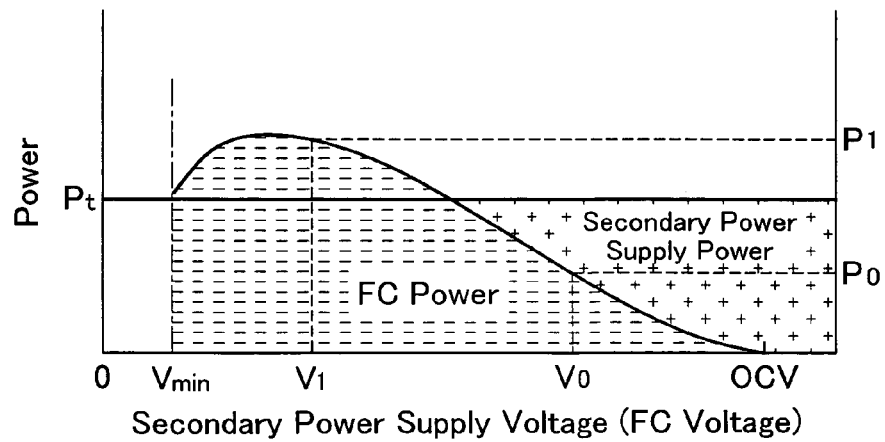

FIGS. 3(A) and 3(B) are illustrations showing control of output of the FC system 30 by means of adjusting the output voltage of the secondary power supply system 20. FIG. 3(a) depicts the Relationship between FC voltage which is the output voltage of the FC system and FC current which is the output current. As will be understood from FIG. 3(a), the relationship is one in which as FC voltage rises FC current becomes lower, and as FC voltage drops FC current becomes greater.

Specifically, when FC voltage is $V_0$, FC current is $I_0$, and FC power is $P_0$. When FC voltage drops to $V_1$, FC current rises to $I_1$ and FC power to $P_1$. However, even if FC voltage should drop further below $V_1$, the increase in FC current is reaching saturation, and FC power, which is the product of FC current and FC voltage, conversely begins to drop.

The hybrid power supply system 100 is arranged so that in order to protect the FC system 30, the FC voltage does not go below an operating minimum voltage $V_{min}$. As a result, the FC system 30 operates at output voltage between the open circuit voltage OCV and the operating minimum voltage $V_{min}$.

FIG. 3(b) shows the power supply status of the FC system 30 (FIG. 1) with the secondary power supply system 20 connected in parallel. Voltage Pt is the drive circuit requested power (FIG. 2) at a given moment. FC power is depicted as a "−" hatched region, and secondary power supply power is depicted as a "+" hatched region. FC power is identical to that shown in FIG. 3(a).

For example, when the secondary power supply voltage is $V_0$, the FC power value is $P_0$ which is smaller than the drive circuit requested power Pt, and so the secondary power supply system 20 supplies power equal to the difference between the drive circuit requested power Pt and $P_0$ (=Pt−$P_0$). On the other hand, when the secondary power supply voltage drops to $V_1$, the FC power value rises to $P_1$ which is greater than Pt, and so the excess power (=$Pt_1$−Pt) of the FC power is supplied to the secondary power supply system 20 (FIG. 2(b)). In this way, it will be appreciated that the hybrid power supply system 100 is able to control FC voltage by means of adjusting secondary power supply voltage (output voltage of the secondary power supply system 20).

By means of this, for example depending on the charging status of the secondary cell described later, output of the FC system 30 can be adjusted. For example in the event that the secondary cell charge is low, it is preferable to make the secondary power supply voltage small. This is because by so doing, the output of the FC system 30 is made larger, creating more opportunities for charging of the secondary cell. On the other hand, in the event that the secondary cell charge is excessive, it is preferable to make the secondary power supply voltage high. This is because by so doing, the output of the FC system 30 is made smaller, creating more opportunities for discharging of the secondary cell.

Figure 4:
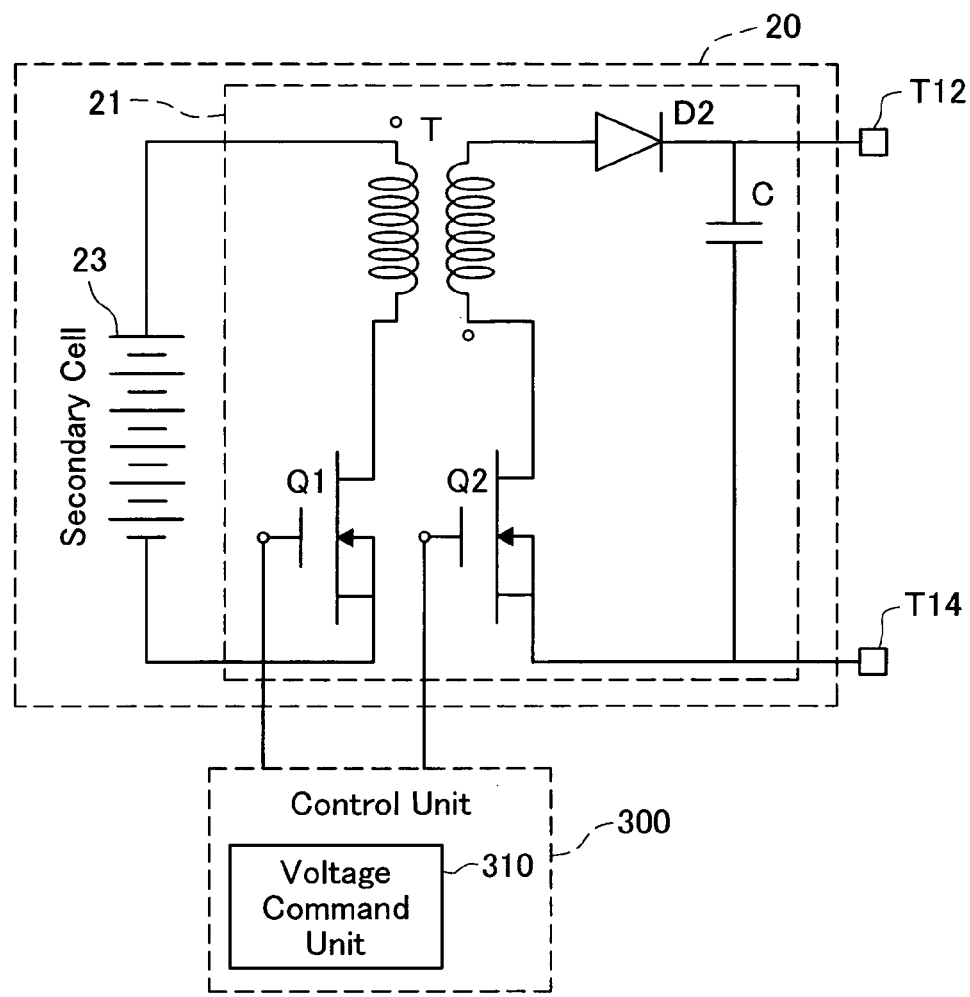
FIG. 4 is an illustration showing the arrangement of a secondary power supply system 20 having a DC-DC converter 21 and a secondary cell 23 in the first embodiment of the invention.

FIG. 4 is an illustration showing the arrangement of the secondary power supply system 20 having the DC-DC converter 21 and the secondary cell 23 in the first embodiment of the invention. The DC-DC converter 21 has two switches Q1, Q2, a transistor T, a diode D2, and a capacitor C. The secondary power supply system 20 can output DC power of any voltage in a predetermined range to two terminals T12, T14.

This DC-DC converter 21, as will be understood from FIG. 4, is constituted as a bidirectional converter of flyback design. This bidirectional converter can supply power from the secondary cell 23, and can also charge the secondary cell 23 with power from the FC system 30 or motor drive circuit 40.

Supply of power by means of the secondary power supply system 20 is carried out by means of the control unit 300 fixing the switch Q2 at "ON", and causing the switch Q1 to undergo ON/OFF operation. When the switch Q1 is made to undergo ON/OFF operation, at the instant that the switch Q1 goes "ON" magnetic energy accumulates at the primary coil end (secondary cell 23 end) of the transistor T, and at the instant that the switch Q1 goes "OFF" electromotive force is produced at the secondary coil end (output end). The output voltage of the secondary power supply system 20 is controllable by means of varying the duty (ON-OFF ratio) of the switch Q1. On the other hand, charging of the secondary cell is carried out by means of the control unit 300 fixing the switch Q1 at "ON", and causing the switch Q2 to undergo ON/OFF operation.

Figure 5:
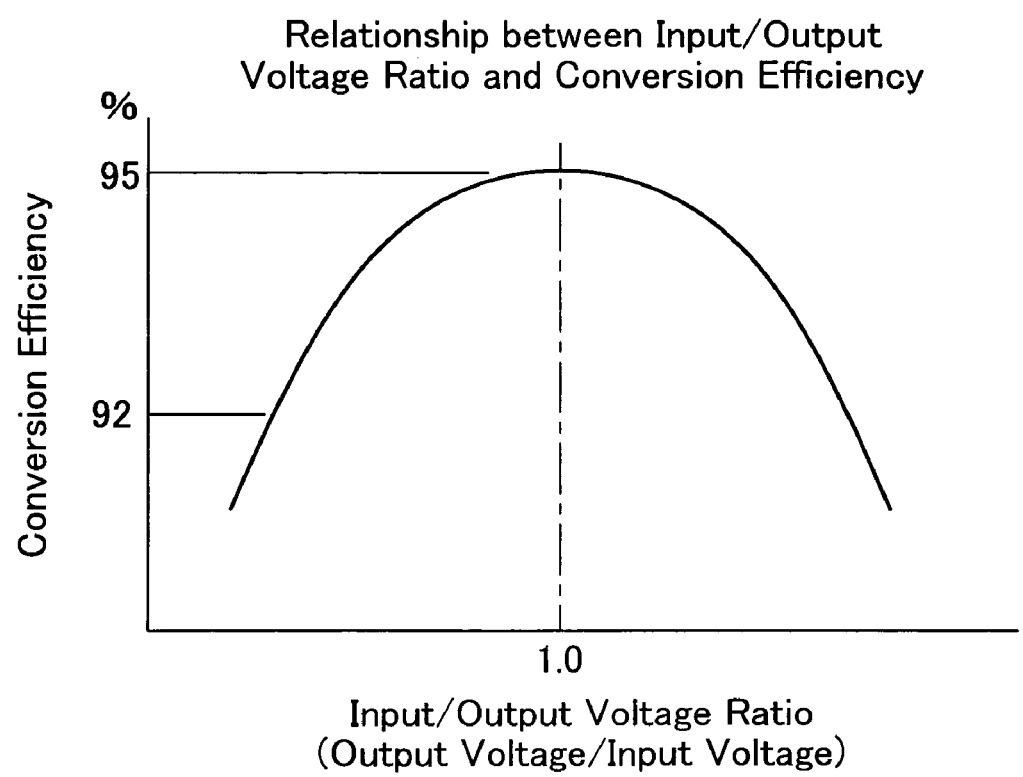
FIG. 5 is an illustration showing the relationship of input/output voltage ratio and conversion efficiency in the DC-DC converter 21 of the first embodiment of the invention.

FIG. 5 is an illustration showing the relationship of input/output voltage ratio and conversion efficiency in the DC-DC converter 21 of the first embodiment of the invention. Input/output voltage ratio is the value obtained by dividing the DC-DC converter 21 output voltage by the input voltage. Conversion efficiency is the value obtained by dividing the DC-DC converter 21 output power by the input power. As will be understood from FIG. 5, when the input/output voltage ratio is "1" there is a peak in conversion efficiency, so it is preferable to arrange the hybrid power supply system 100 such that there are more instances of operation in a state where output voltage of the secondary power supply system 20 and output voltage of the secondary cell are equal.

Figure 6:
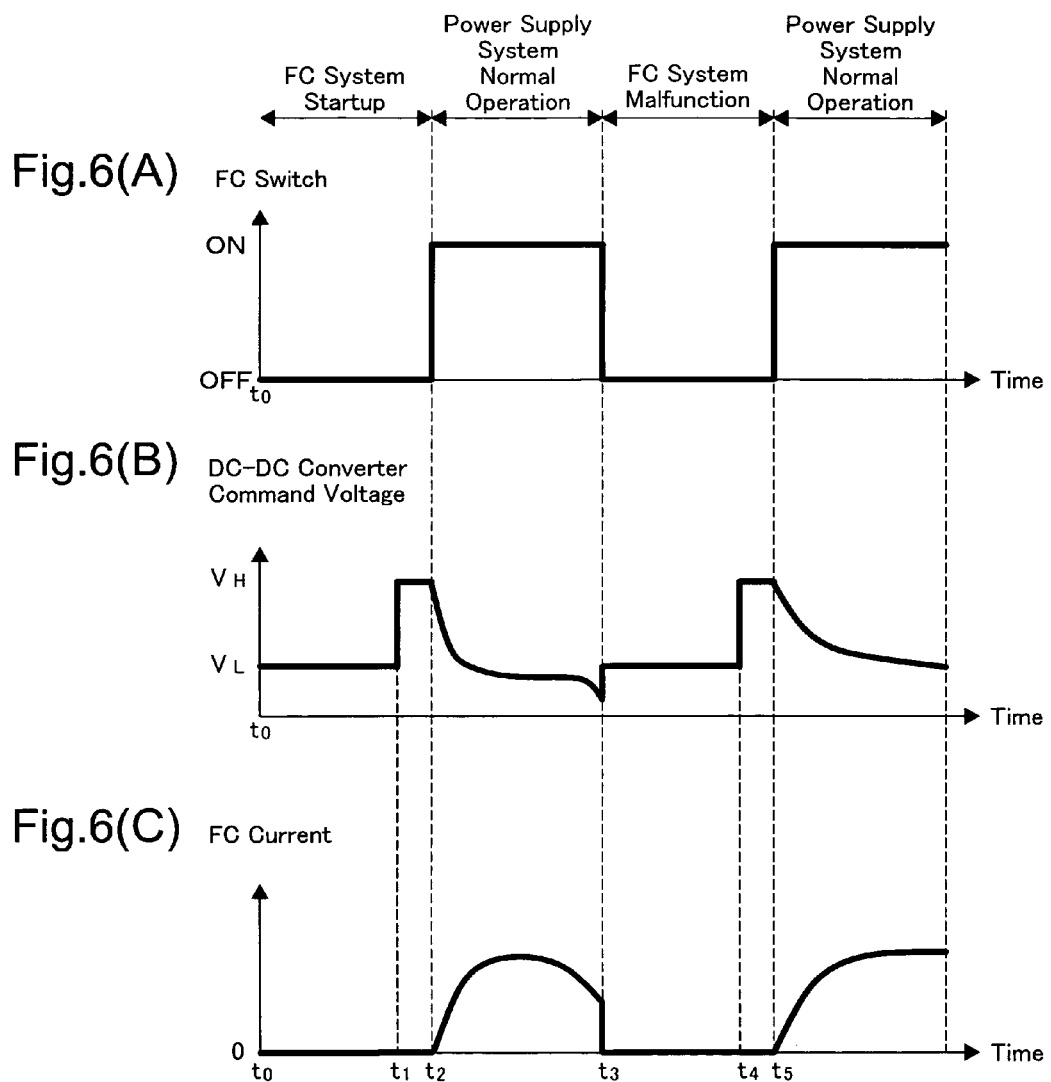
FIGS. 6(A), 6(B) and 6(C) are time charts showing operation of the hybrid power supply system in the first embodiment of the invention.

B. Operation of Hybrid Power Supply System in the First Embodiment of the Invention:

FIGS. 6(A), 6(B) and 6(C) are time charts showing operation of the hybrid power supply system in the first embodiment of the invention. FIG. 6 shows the status of the hybrid power supply system 100 in an exemplary sequence, namely, a sequence of (1) startup of the FC system 30, (2) normal operation of the hybrid power supply system, (3) malfunction of the FC system 30, and (4) normal operation of the hybrid power supply system.

As the status of the hybrid power supply system 100, operating status of thus FC switch 32, DC-DC converter 21 command voltage, and FC current are shown as a time chart. In this Specification, normal operation of the hybrid power supply system means parallel operating status whereby power can be supplied from both the FC system 30 and the secondary cell 23.

At the time of startup of the FC system 30, the control unit 300 has set the FC switch 32 to OFF (time $t_0$ in FIG. 6(a)). Startup of the FC system 30 refers to a process whereby, for example, a reformer (not shown) that produces hydrogen gas becomes able to produce hydrogen gas of predetermined quality making the FC system 30 able to display predetermined performance. At the time of startup of the FC system 30, since the FC switch 32 is OFF, once a state of being able to display predetermined performance is reached, supply of power by the FC system 30 commences. As a result, at the time of startup of the FC system 30, FC current does not flow (FIG. 6(c)).

At the time of startup of the FC system 30, command voltage of the DC-DC converter 21 is set to voltage $V_L$. Voltage $V_L$ is the output voltage of the secondary cell 23 when the secondary cell 23 can run at best efficiency. Setting of the command voltage of the DC-DC converter 21 to voltage $V_L$ is for the purpose of raising conversion efficiency, with the input/output voltage ratio of the DC-DC converter 21 at "1."

However, as startup of the FC system 30 nears completion, the control unit 300 increases the command voltage of the DC-DC converter 21 to voltage $V_H$. Voltage $V_H$ is voltage that is higher than the open circuit voltage OCV (FIG. 3) of the FC system 30 (time $t_1$). Making the command voltage of the DC-DC converter 21 a voltage higher than the open circuit voltage OCV of the FC system 30 is for the purpose of avoiding sudden flow of large current from the FC system 30 when the FC switch (FIG. 1) is turned ON.

When the FC switch 32 is turned ON, normal operation of the hybrid power supply system 100 commences. Even though the output voltage of the DC-DC converter 21 is connected in a state of being higher than the open circuit voltage OCV of the FC system 30, no countercurrent occurs due to the presence of the diode D1 for countercurrent prevention.

At the time normal operation of the hybrid power supply system commences, the output voltage of the DC-DC converter 21 is higher than the open circuit voltage of the FC system 30, so FC current does not flow (time $t_2$). However, subsequently, when the output voltage of the DC-DC converter 21 which is the secondary power supply voltage drops to below the open circuit voltage OCV of the FC system 30, FC current begins to flow (FIG. 6(c), FIG. 3(b)). In this way, with the arrangement of this embodiment, FC voltage can be gradually increased by gradually dropping the output voltage of the DC-DC converter 21.

During normal operation of the hybrid power supply system (period $t_2$–$t_3$), the control unit 300 determines the command voltage of the DC-DC converter 21 depending on charge status of the secondary cell 23 as mentioned previously. Preferably, the hybrid power supply system 100 will be arranged such that the command voltage is adjusted to close to voltage $V_L$. This is because by so doing, the hybrid power supply system 100 assumes most efficient operating status at normal operation as the system as a whole.

When a malfunction of the FC system 30 is detected during normal operation, the control unit 300 isolates the FC system 30 from the hybrid power supply system 100 (time $t_3$). Detection of FC system 30 malfunction can be carried out, for example, on the basis of observed values of quality of hydrogen gas produced within the FC system 30 or the internal resistance of the FC system 30. Isolation of the FC system 30 is carried out by turning the FC switch 32 OFF.

Once isolation of the FC system 30 from the hybrid power supply system 100 has been confirmed, the control unit 300 fixes the command voltage of the DC-DC converter 21 at voltage $V_L$. By so doing, the secondary power supply system 20 can operate at high efficiency.

Once recovery of the FC system 30 has been confirmed, the control unit 300 performs a process to connect the FC system 30 to the hybrid power supply system 100. Confirmation of recovery of the FC system 30 can also be carried out, for example, on the basis of observed values of quality of hydrogen gas produced within the FC system 30 or the internal resistance of the FC system 30. The process for connecting the FC system 30 refers to an operation that raises the output voltage of the DC-DC converter 21 to voltage $V_H$ (time $t_4$).

The process carried out by connection after recovery of the FC system 30 (starting at time $t_5$) is substantially identical to the process carried out by connection after startup of the FC system 30. However, in the process carried out by connection after recovery of the FC system 30, the rate of drop in output voltage of the DC-DC converter 21 after connection is set slower than the process carried out by connection after startup of the FC system 30. Carrying out the process in this way is in consideration of the fact that once the FC system 30 has experienced a malfunction it is likely to malfunction again.

Figure 7:
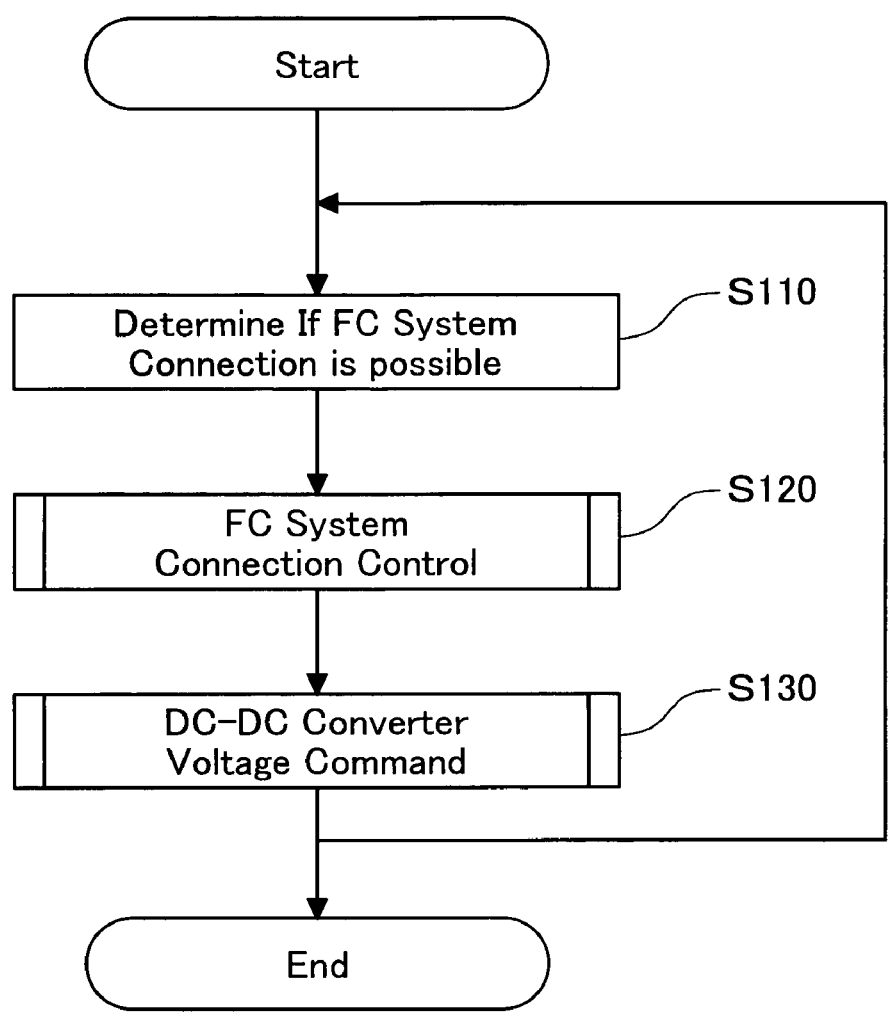
FIG. 7 is a flowchart showing the content of control of the hybrid power supply system in the first embodiment of the invention.

FIG. 7 is a flowchart showing the content of control of the hybrid power supply system 100 in the first embodiment of the invention. In Step S110, the control unit 300 determines whether connection of the FC system 30 is possible. [The determination as to] whether connection of the FC system 30 is possible can be carried out on the basis of the quality of hydrogen gas produced within the FC system 30 as mentioned earlier. If it is determined that connection of the FC system 30 is possible, the control unit 300 sets the connection flag to "ON." In Step S120, the control unit 300 carries out control for the purpose of connecting the FC system 30 to the hybrid power supply system 100.

Figure 8:
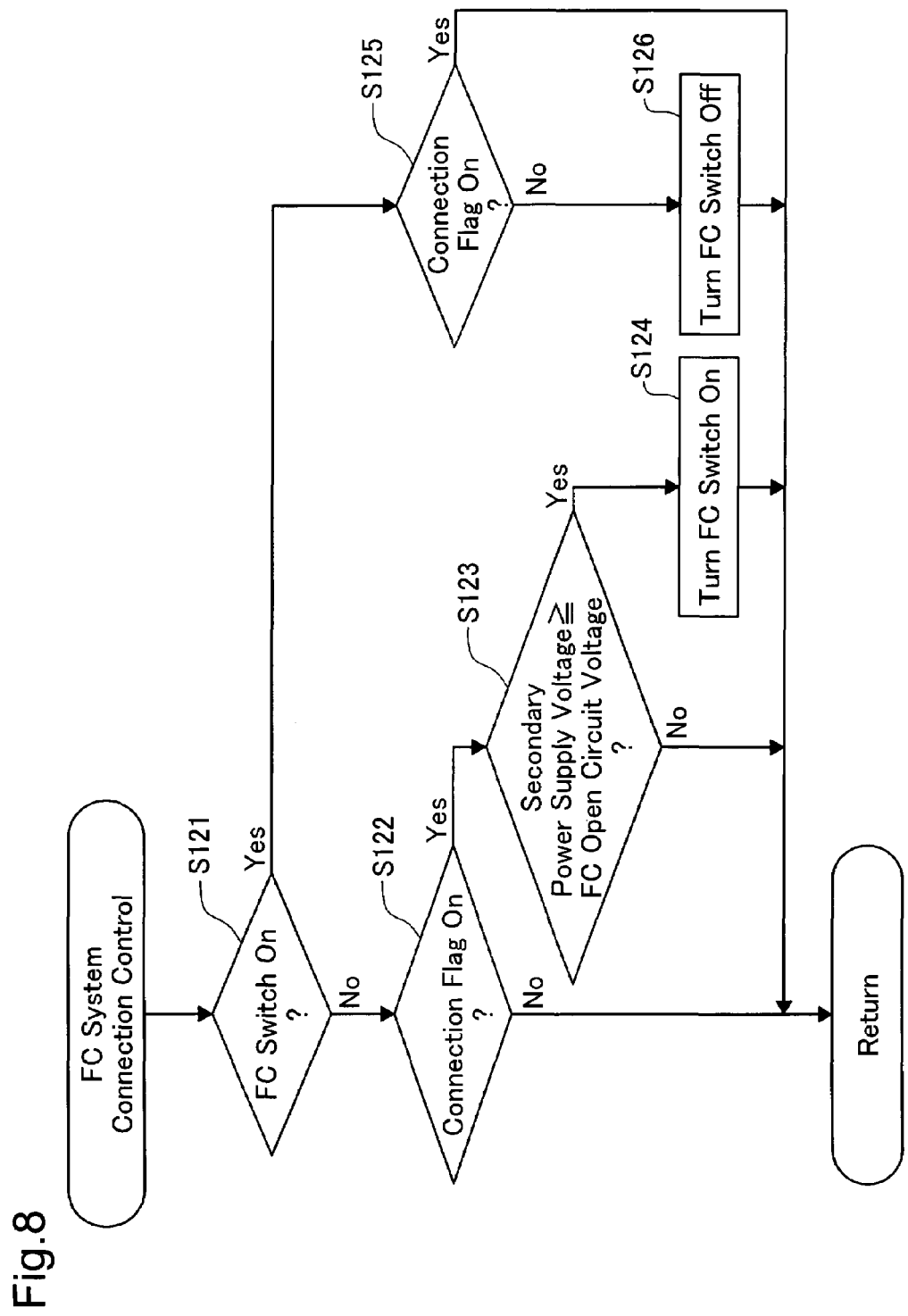
FIG. 8 is a flowchart showing the content of FC system connection control performed in Step S120.

FIG. 8 is a flowchart showing the content of FC system connection control performed in Step S120. In Step S121, the control unit 300 determines whether the FC switch 32 is "ON" or "OFF." This determination can be carried out, for example, by comparing the output voltage of the FC system 30 with the output voltage of the secondary power supply system 20. Output voltage of the FC system 30 and output voltage of the secondary power supply system 20 can be measured using the voltmeter 36 and the voltmeter 22, respectively.

Specifically, where the two are normally substantially identical, it is determined that the FC switch 32 is "ON", and the process advances to Step S125 described later. On the other hand, if the two do not coincide, is determined that the FC switch 32 is "OFF", and the process advances to Step S122.

In Step S122, the control unit 300 the control unit 300 determines whether the set connection flag is "ON." In the event that the connection flag is "OFF", i.e. in the event that connection is disabled, the process advances to Step S130 (FIG. 7) described later. On the other hand, in the event that the connection flag is "ON", i.e. in the event that connection is enabled, the process advances to Step S123.

In Step S123, the control unit 300 determines whether the secondary power supply voltage is higher than the FC open circuit voltage OCV. If it is determined that the secondary power supply voltage is higher than the FC open circuit voltage OCV, the process advances to Step S124. In Step S124, the control unit 300 turns the FC switch 32 "ON" and connected the FC system 30 to the hybrid power supply system 100. If on the other hand it is not determined that the secondary power supply voltage is higher than the FC open circuit voltage OCV, process advances to Step S130 (FIG. 7) described later.

In Step S125 on the other hand, the control unit 300 determines in the same manner as in Step S122 whether the set connection flag is "ON." In the event that the connection flag is "OFF", the FC switch 32 is immediately turned "OFF" to isolate the FC system 30 from the hybrid power supply system 100, and the process advances to Step S130. If on the other hand the connection flag is "ON", the process advances to Step S130 without isolating the FC system 30 from the hybrid power supply system 100. In Step S130, the voltage command unit 310 (FIG. 4) belonging to the control unit 300 determines the command voltage of the DC-DC converter 21.

Figure 9:
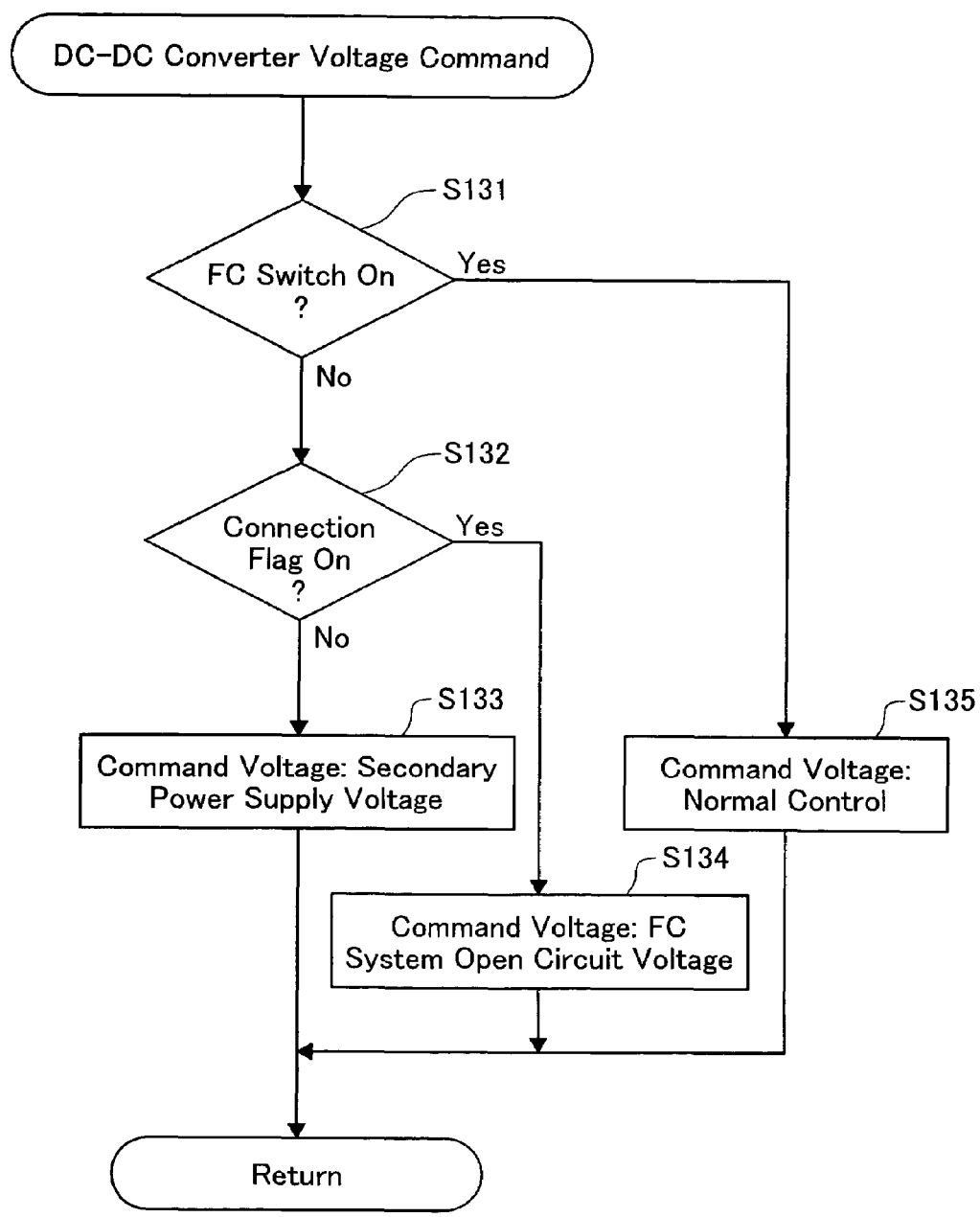
FIG. 9 is a flowchart showing the logic of the DC-DC converter voltage command.

FIG. 9 is a flowchart showing the logic of the DC-DC converter voltage command. In Step S131, the voltage command unit 310, in the same manner as Step S121, determines whether the FC switch 32 is "ON" or "OFF." If it is determined that the FC switch 32 is "ON" the process advances to Step S123. In Step S135, the normal control described previously is carried out. On the other hand, if it is determined that the FC switch 32 is "OFF" the process advances to Step S132.

In Step S132, the voltage command unit 310 determines whether the set connection flag is "ON" or "OFF." In the event that the connection flag is "OFF", i.e. in the event that connection is disabled, the process advances to Step S133. In Step S133, the voltage command unit 310 adjusts the DC-DC converter 21 command voltage so as to coincide with the output voltage of the secondary cell 23. This is in order to raise DC-DC converter 21 conversion efficiency and efficiently run the secondary power supply system 20 with the FC system 30 in the isolated state.

On the other hand, in the event that the connection flag is "ON", i.e. in the event that connection is enabled, the process advances to Step S134. In Step S134, the voltage command unit 310 sets the DC-DC converter 21 command voltage to higher voltage than the FC open circuit voltage OCV. By so doing, connection of the FC system 30 in Step S120 is enabled (Steps S123, S124).

In this way, when the FC system 30 which is a fuel cell is connected to the power supply wirings, terminal voltage of the secondary power supply system 20 connected in parallel with the FC system 30 is made to rise above the values which it can assume in normal operation, so excess current which can occur when the FC system 30 is connected to the power supply system can be suppressed.

Figure 10:
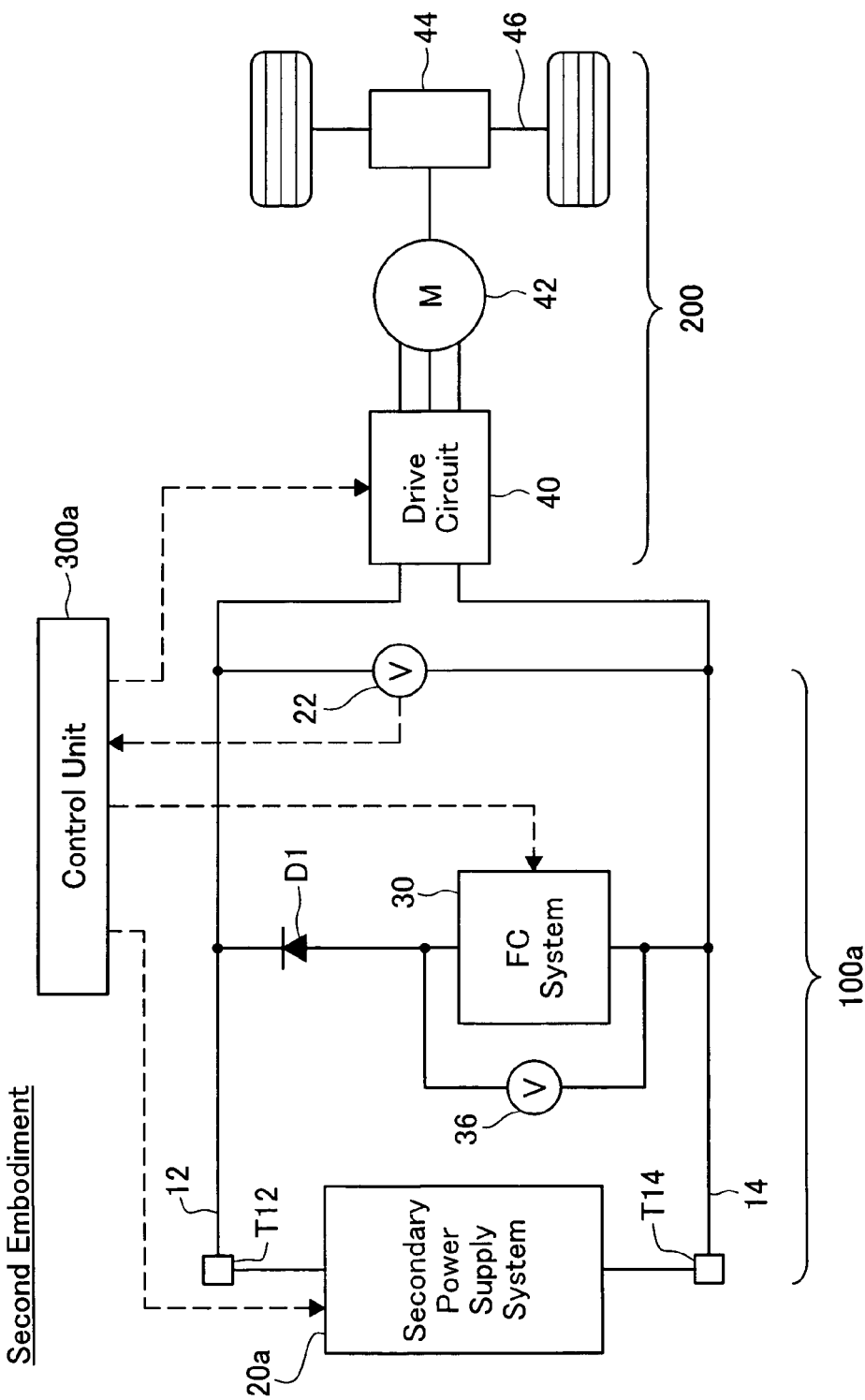
FIG. 10 is a simplified schematic diagram of an electric car equipped with the power supply system in the second embodiment of the invention.

C. Arrangement of Hybrid Power Supply System in the Second Embodiment of the Invention:

FIG. 10 is a simplified schematic diagram of an electric car equipped with the power supply system in the second embodiment of the invention. This electric car differs from the vehicle system of the first embodiment (FIG. 1) in that the secondary power supply system 20 and the control unit 300 are replaced respectively by a secondary power supply system 20a and a control unit 300a, and the FC switch 32 series-connected between the fuel cell system 30 and the power supply wiring 12 in the first embodiment is eliminated.

Figure 11:
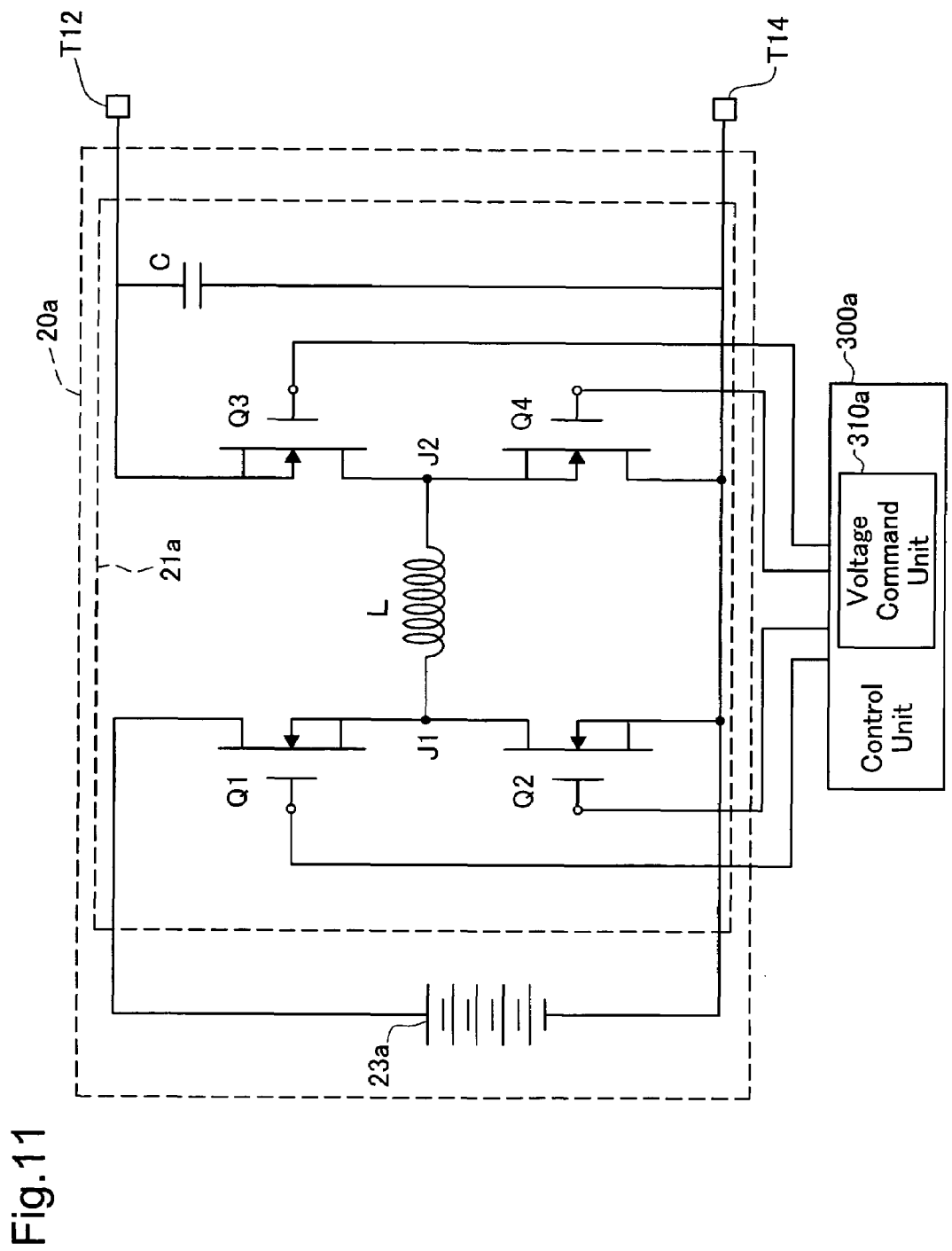
FIG. 11 is an illustration showing the arrangement of the secondary power supply system 20a of the second embodiment of the invention.

FIG. 11 is an illustration showing the arrangement of the secondary power supply system 20a of the second embodiment of the invention. The secondary power supply system 20a comprises a bidirectional DC-DC converter circuit 21a, and a rechargeable secondary cell 23a. The secondary cell 23a is designed so that, where the charging rate is equal to or greater than a predetermined value, in the event of supply of power at a hypothetical maximum value of drive circuit requested power, it can supply power at voltage higher than the open circuit voltage OCV of the FC system 30. In this embodiment, the hypothetical maximum value of drive circuit requested power may also be referred to as a "predetermined electrical power."

The bidirectional DC-DC converter circuit 21a comprises a secondary cell-side series circuit, a load-side series circuit, inductance L, and a capacitor C. The secondary cell-side series circuit comprises a switch Q1 and a switch Q2. The load-side series circuit comprises a switch Q3 and a switch Q4. In this embodiment, MOS-FETs are used as the four switches Q1, Q2, Q3, Q4.

The two switches Q1, Q2 of the secondary cell-side series circuit are connected as follows on the secondary cell 23a side. One terminal of the switch Q1 and one terminal of the switch Q2 are connected at connection point J1. The other terminal of the switch Q1 is connected to the cathode of the secondary cell 23a. The other terminal of the switch Q2 is connected to the anode of the secondary cell 23a. The gate terminals of the two switches Q1, Q2 are connected to the control unit 300a.

The two switches Q3, Q4 of the load-side series circuit are connected as follows on the load 200 side. One terminal of the switch Q3 and one terminal of the switch Q4 are connected at connection point J2. The other terminal of the switch Q3 is connected to the cathode of the load 200. The other terminal of the switch Q4 is connected to the anode of the load 200. The gate terminals of the two switches Q3, Q4 are connected to the control unit 300a.

Inductance L is connected between connection point J1 and connection point J2. The anode of the secondary cell 23a is connected to the anode of the load 200.

The bidirectional DC-DC converter circuit 21a can operate bidirectionally in two modes: a mode in which power is supplied from the secondary cell-side series circuit to the load-side series circuit, and a mode in which power is supplied from the load-side series circuit towards the secondary cell-side series circuit. This manner of operation is realized by appropriate making/breaking operation of the four switches Q1, Q2, Q3, Q4 by the control unit 300a.

Figure 12:
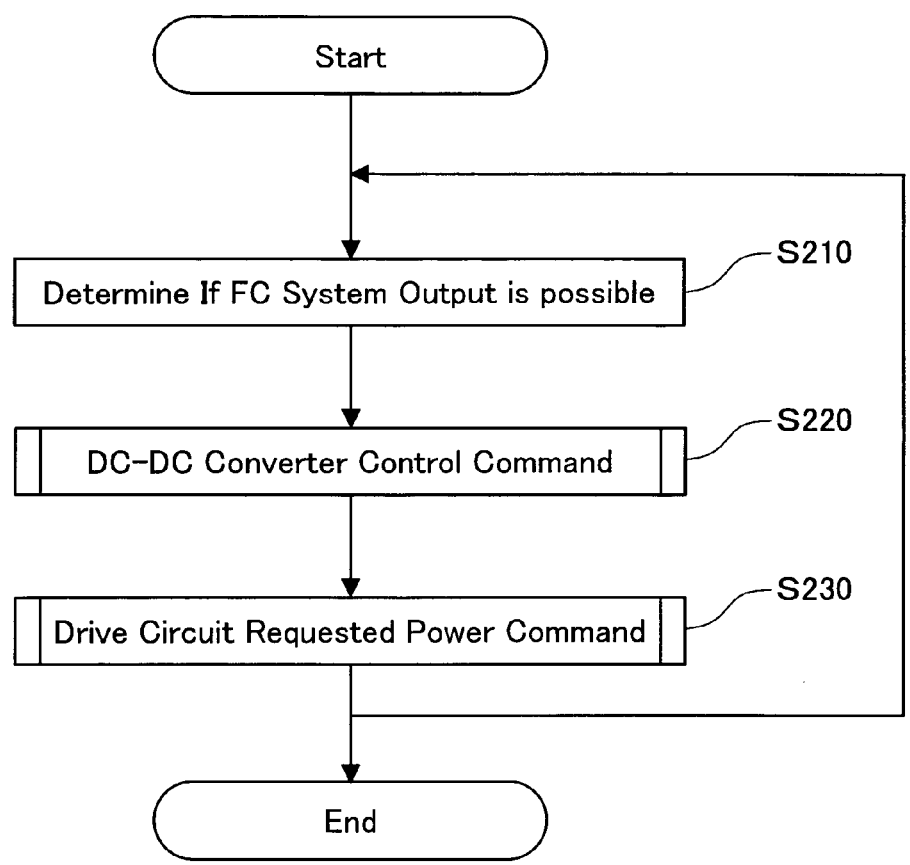
FIG. 12 is a flowchart showing the content of control of the hybrid power supply system 100a in the second embodiment of the invention.

D. Operation of Hybrid Power Supply System in the Second Embodiment of the Invention:

FIG. 12 is a flowchart showing the content of control of the hybrid power supply system 100a in the second embodiment of the invention. In Step S210, the control unit 300a determines whether output of the FC system 30 is enabled. This determination is a determination as to whether the FC system 30 may be made to output power; in this embodiment, the determination is of identical content with the determination of whether connection is enabled in the first embodiment. If it is determined that output of the FC system 30 is enabled, the control unit 300a sets the output flag to "ON." The initial status of the output flag is "OFF."

In Step S220, the voltage command unit 310a (FIG. 11) belonging to the control unit 300a determines the content of the control command of the DC-DC converter circuit 21a. The DC-DC converter circuit 21a has a normal control mode and a short circuit mode.

The normal control mode is an operating mode in which DC power of any voltage within a predetermined range is output in the same manner as the DC-DC converter 21 of the first embodiment. The short circuit mode is an operating mode in which the secondary cell 23a and the drive circuit 40 are shorted to suppress heat loss in the DC-DC converter circuit 21a.

Figure 13:
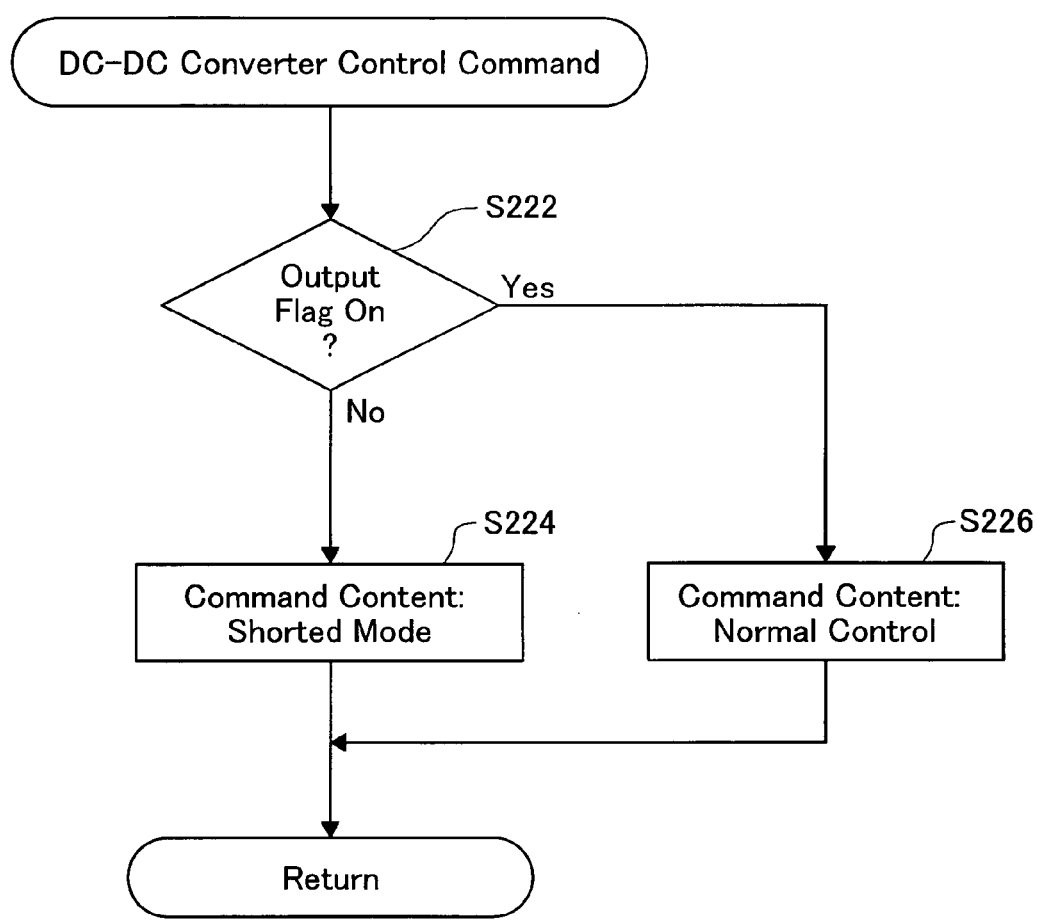
FIG. 13 is a flowchart showing the logic of the DC-DC converter control command.

FIG. 13 is a flowchart showing the logic of the DC-DC converter control command. In Step S222, the voltage command unit 310a determines whether the set output flag is "ON" or "OFF." As a result, in the event that the output flag is "OFF", i.e. output is disabled, the process advances to Step S224. In the event that the output flag is "ON", i.e. output is enabled, the process advances to Step S226.

In Step S266, the voltage command unit 310a carries out normal control. Specifically, the voltage command unit 310a adjusts the command voltage of the DC-DC converter circuit 21a depending on the charge status of the secondary cell 23a in the same manner as in the first embodiment.

Figure 14:
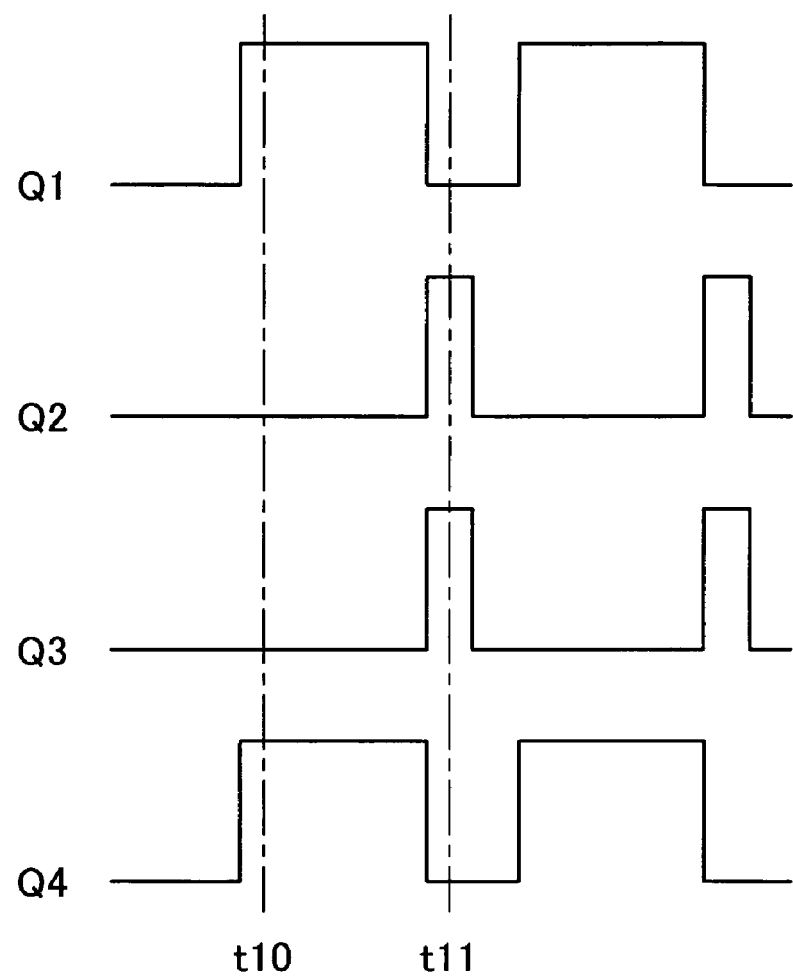
FIG. 14 is a time chart representing in a time series voltage applied to the gate terminals of four switches Q1, Q2, Q3, Q4 by a control unit 300a during power supply in normal control mode.

FIG. 14 is a time chart representing in a time series voltage applied to the gate terminals of four switches Q1, Q2, Q3, Q4 by the control unit 300a during power supply in normal control mode. By means of application of such voltage, ON/OFF (make/break) control of the four switches Q1, Q2, Q3, Q4 is carried out, whereby the DC power from the secondary cell 23a rises and is supplied to the load 200.

Figure 15A:
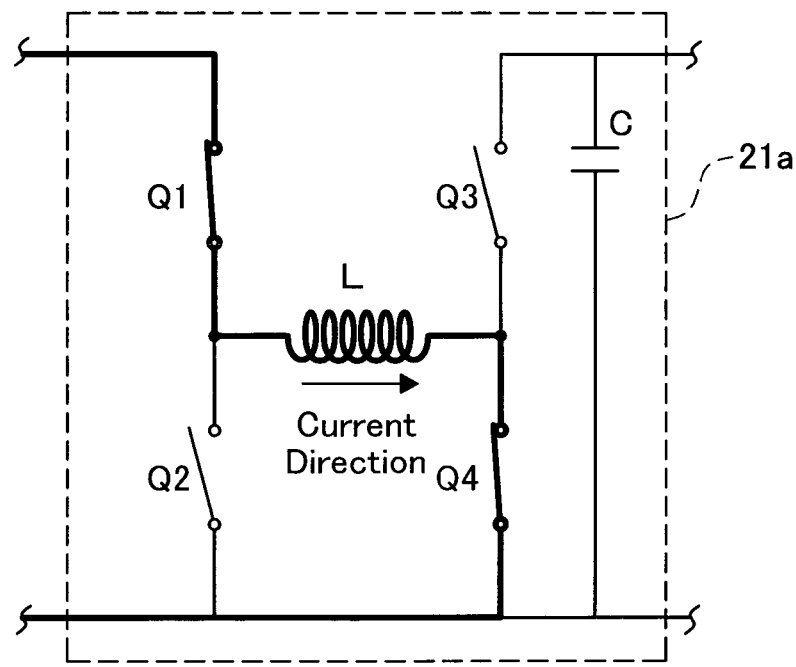
FIGS. 15(A) and 15(B) are illustrations showing operating status of a bidirectional DC-DC converter circuit 21a when power is supplied to a load 200.
Figure 15B:
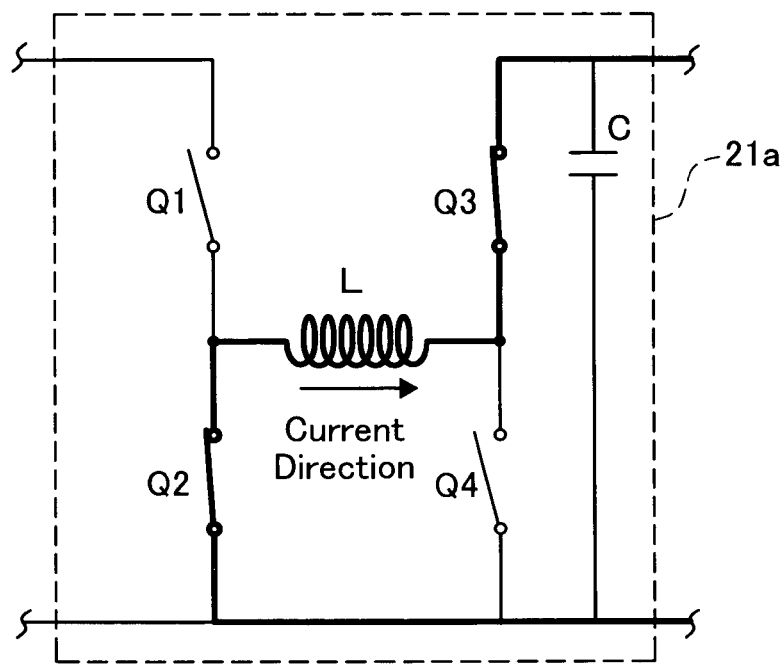

FIGS. 15(A) and 15(B) are illustrations showing operating status of the bidirectional DC-DC converter circuit 21a when power is supplied to the load 200. Specifically, the following voltage conversion operations are carried out by means of, ON/OFF control of the four switches Q1, Q2, Q3, Q4.

(1) At time t10 (FIG. 14), the two switches Q1, Q4 are ON, and the two switches Q2, Q2 are OFF (FIG. 15(*a*)). By means of this, inductance L is connected to the secondary power supply 3 side. At this time, magnetic energy is accumulated in the inductance L.

(2) At time t11, the two switches Q1, Q4 are OFF, and the two switches Q2, Q2 are ON (FIG. 15(*b*)). By means of this, the inductance L is connected to the load 200 side. At this time, the magnetic energy accumulated in inductance L is supplied as power to the load 200 side.

The voltage of the power supplied to the load 200 side can be controlled by means of means of the control unit 300a adjusting the duty ratio (ON-OFF ratio). If the duty ratio is large, the voltage of the power supplied to the load 200 side can be increased, and if the duty ratio is small, the voltage of the power supplied to the load 200 side can be decreased. Also, where the duty ratio is small, power can be supplied from the load 200 side to the secondary cell 23a side, to charge the secondary cell 23a.

Here, "ON" and "OFF" in the duty ratio (ON-OFF ratio) are defined as follows. "ON" is the state in which the two switches Q1, Q4 are ON, and the two switches Q2, Q2 are OFF (FIG. 15(*a*)). "OFF" is the state in which the two switches Q1, Q4 are OFF, and the two switches Q2, Q2 are ON (FIG. 15(*b*)).

In this way, the bidirectional DC-DC converter circuit 21a, like the bidirectional DC-DC converter 21 of the first embodiment, carries out voltage conversion operations in order to supply power the load 200 side with the burden appropriately shared by the FC system 30 and the secondary cell 23a.

In Step S224 (FIG. 13), the control unit 300a controls the DC-DC converter 21 so that the operating mode is the short circuit mode.

Figure 16A:
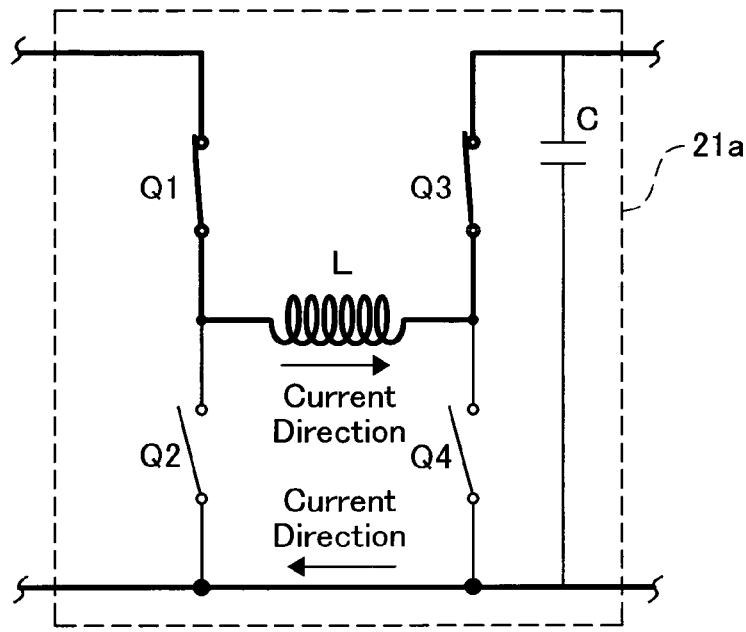
FIGS. 16(A) and 16(B) are illustrations showing operation of the bidirectional DC-DC converter circuit 21a in short circuit mode.
Figure 16B:
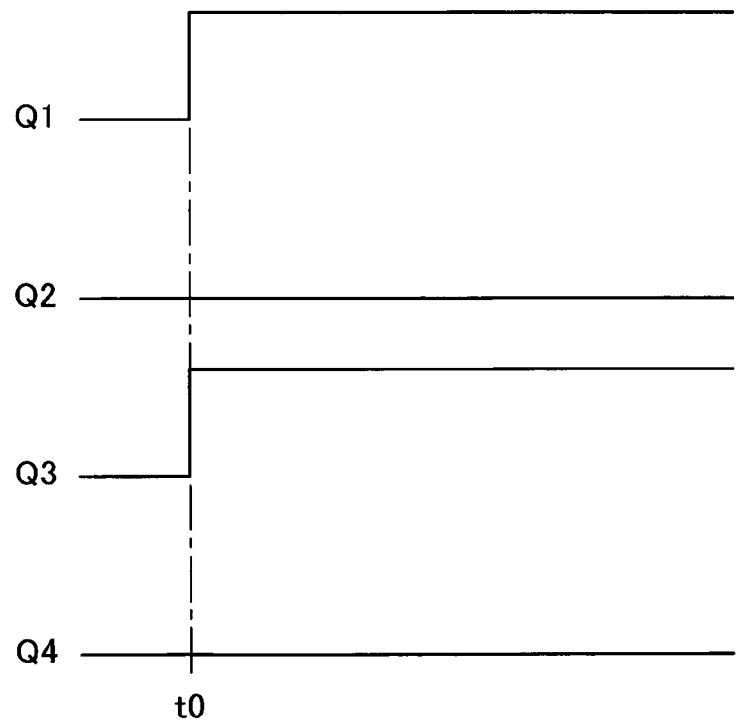

FIGS. 16(A) and 16(B) are illustrations showing operation of the bidirectional DC-DC converter circuit 21a in short circuit mode. The control unit 300a fixes the two switches Q1, Q3 at ON, and fixes the two switches Q2, Q4 at OFF. By means of this control, the load 200 side and the secondary cell 23*a* side are connected via inductance L without any switching operation.

Figure 17:
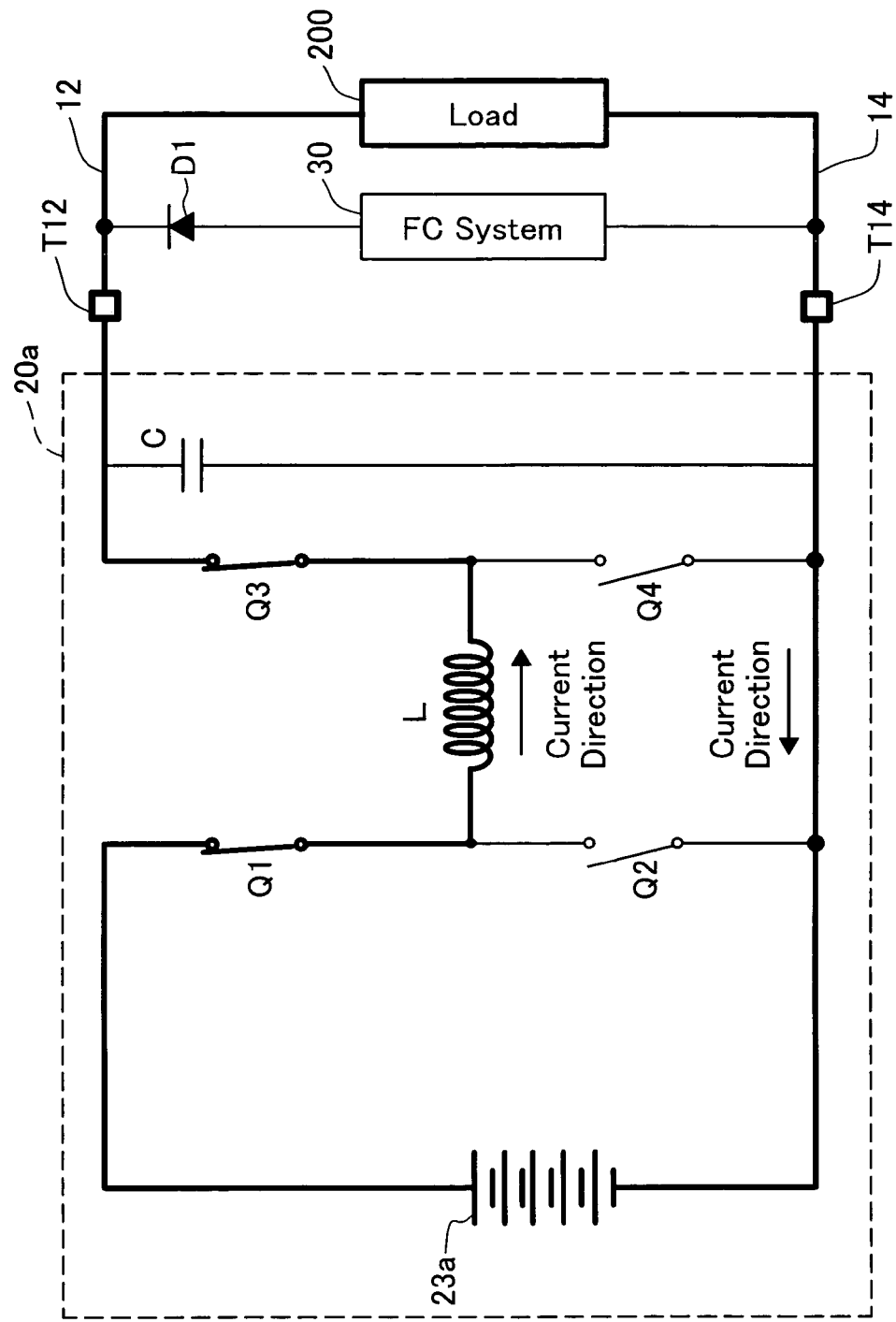
FIG. 17 is an illustration showing operating status of the hybrid power supply system 100a in short circuit mode.

FIG. 17 is an illustration showing operating status of the hybrid power supply system 100*a* in short circuit mode. As will be understood from FIG. 17, the load 200 and the secondary cell 23*a* are connected via wiring and inductance L only. It will be understood that since both the wiring or inductance L produce substantially no power loss, switching loss and other power loss in the bidirectional DC-DC converter circuit 21*a* is substantially zero.

Where the bidirectional DC-DC converter circuit 21*a* is in short circuit mode, the FC system 30 does not output power. This is because the output voltage of the bidirectional DC-DC converter circuit 21*a* in short circuit mode is equivalent to the output voltage of the secondary cell 23*a*, which is higher than the open end voltage of the FC system 30.

In Step S230 (FIG. 12), the control unit 300*a* commands requested power of the drive circuit. In this embodiment, requested power of the drive circuit is determined in consideration of the power outputtable by the hybrid power supply system 100*a*.

Figure 18:
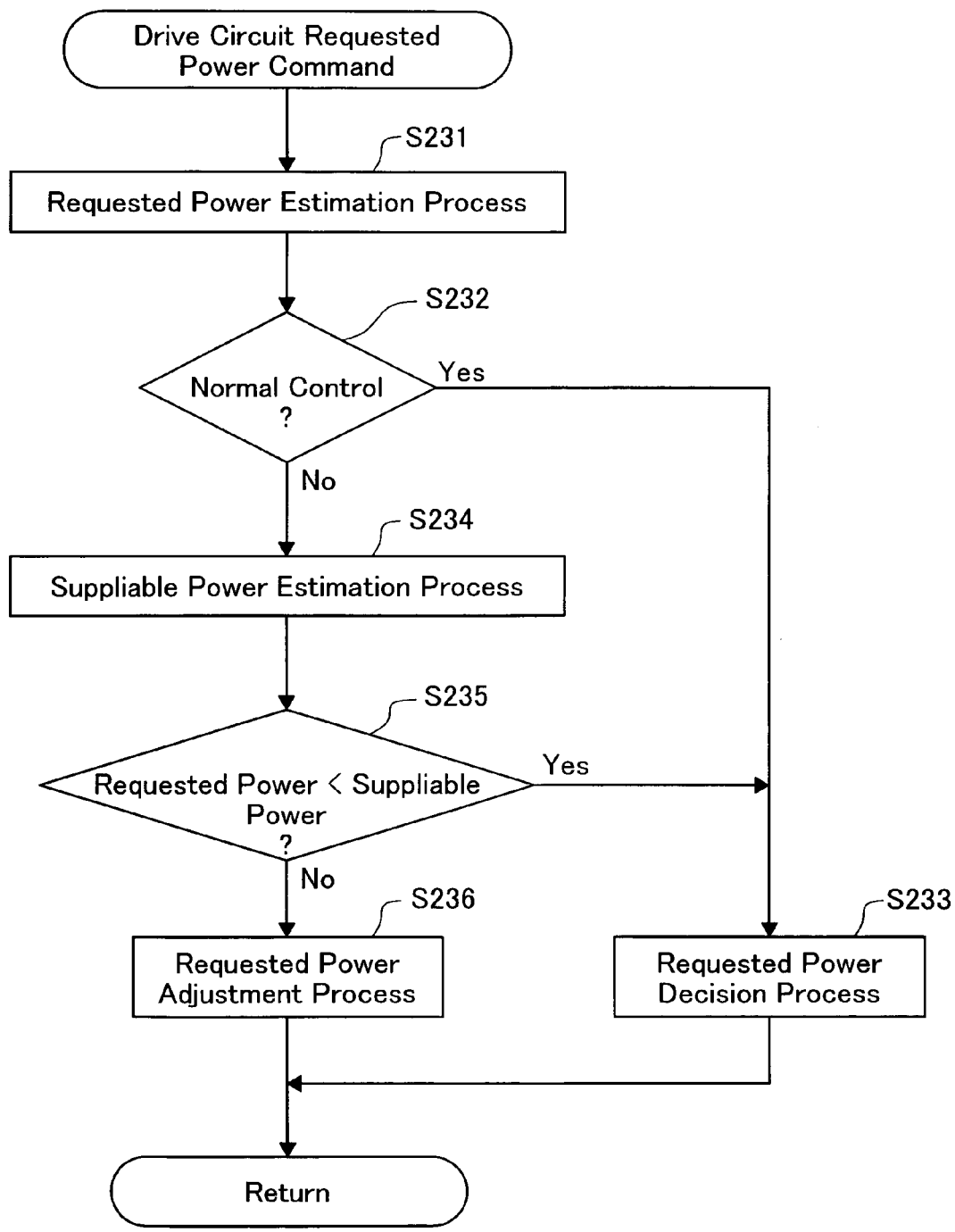
FIG. 18 is a flowchart showing an example of a process for determining drive circuit requested power command content.

FIG. 18 is a flowchart showing an example of a process for determining drive circuit requested power command content. This process is a process that, in the event that the operating mode of the bidirectional DC-DC converter circuit 21*a* is the short circuit mode, limits requested power to the power outputtable by the hybrid power supply system 100, i.e. the power outputtable by the secondary cell 23*a*. In short circuit mode, the power outputtable by the hybrid power supply system 100 is equal to the power outputtable by the secondary cell 23*a*.

As noted, the secondary cell 23*a* in this embodiment is arranged such that, where the charge rate is equal to or greater than a predetermined value, in the event of supply of power of at a hypothetical maximum value of drive circuit requested power, it can supply power at voltage higher than the open circuit voltage OCV of the FC system 30.

In Step S231, the control unit 300*a* estimates requested power of the drive circuit depending on input from the accelerator (not shown) in the same manner as in the first embodiment.

In Step S232, the control unit 300*a* determines whether the operating mode of the bidirectional DC-DC converter circuit 21*a* is the normal control mode or the short circuit mode. As a result, in the event that the operating mode is the normal control mode, the process advances to Step S233, and in the event that the operating mode is the short circuit mode, the process advances to Step S234.

In Step S233, the control unit 300*a* decides on the requested power estimated in Step S231 without adjustment as the requested power of the drive circuit. In Step S234, on the other hand, the control unit 300*a* estimates the outputtable power of the secondary cell 23*a*. This is because the outputtable power of the secondary cell 23*a* varies depending on the charge status of the secondary cell 23*a*.

Figure 19:
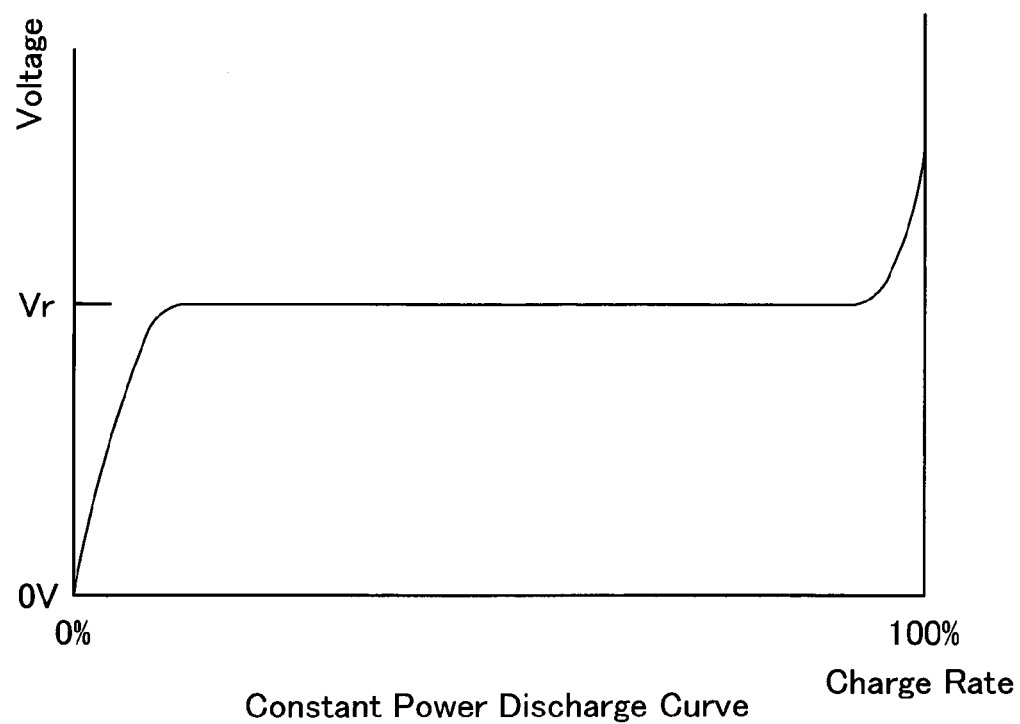

FIG. 19 is a graph representing a constant power discharge curve of the secondary cell 23*a*. The constant power discharge curve is a curve representing the relationship of voltage and charging rate when constant power is output. As will be apparent from the drawing, the secondary cell 23*a* varies greatly in internal resistance at two locations of a charging rate close to 0% and a charging rate close to 100%, so in the event that the charging rate is close to 0% or close to 100%, this can be estimated by means of measuring this variation with the voltmeter 22.

In the event that the secondary cell 23*a* is in a state of some other charging rate, the charging rate can be estimated by means of time integration of current value of charge/discharge until the charge rate reaches either of the two locations close to 0% and or close to 100%.

In Step S235, the control unit 300*a* determines whether the requested power of the drive circuit exceeds the outputtable power of the secondary cell 23*a*. This determination can be carried out, for example, on the basis of the criterion that in the event that power is supplied at the requested power of the drive circuit, the output voltage of the secondary cell 23*a* does not go below the open end voltage of the FC system 30 within a predetermined time interval determined in advance. As a result, in the event that it does not exceed, the requested power estimated in Step S231 is decided on as is as the requested power of the drive circuit (S233), whereas in the event that it does exceed, the process advances to Step S236.

In Step S236, the control unit 300*a* adjusts the requested power depending on the outputtable power of the secondary cell 23*a*. In this embodiment, this adjustment is carried out by means of limiting the output voltage of the secondary cell 23*a* so as to not go below the open end voltage of the FC system 30 within a predetermined time interval. This is because by so doing, output of power from the FC system 30 which is not in the output enabled state will not occur suddenly.

In this way, in the second embodiment, the secondary cell 23*a* is arranged so that in the event that the charging rate is equal to or greater than a predetermined value, it can supply power at voltage higher than the open circuit voltage OCV of the FC system 30 regardless of the drive circuit requested power, as well as being arranged so that in the event that the charging rate of the secondary cell 23*a* drops, the drive circuit requested power will be adjusted so that output voltage does not drop below the open end voltage of the FC system 30 within a predetermined time interval. By so doing, accidental output from the FC system 30 can be suppressed, while being able to install the FC system 30 in a hybrid power supply system without an intervening switch.

Further, in this embodiment, there is also the advantage that when the FC system 30 cannot output power, the hybrid power supply system 100*a* avoids switching loss in the DC-DC converter circuit 21*a* and supplies power with high efficiency.

The criterion for determining whether the requested power of the drive circuit exceeds the outputtable power of the secondary cell 23*a* is not limited to that described previously and can be decided on depending on the characteristics of the system, namely fuel cell characteristics or secondary cell characteristics. Further, an arrangement whereby the output voltage of the secondary cell 23*a* is monitored, while limiting the requested power of the drive circuit immediately in response to a drop thereof would also be acceptable.

The "secondary cell" need simply be rechargeable, and has a broad meaning that includes not only batteries, but also capacitors.

E. Variation Examples:

This invention is not limited to the working embodiments set forth hereinabove, and may be reduced to practice in various modes without departing from the spirit thereof, such as in the following variation examples, for example.

E-1. In the first embodiment, when connecting the FC system 30 to the hybrid power supply system 100, terminal voltage of the secondary power supply system 20 is higher than the open circuit voltage of the FC system 30, but an arrangement whereby, for example, it is made to rise to voltage close to the open circuit voltage (but less than the open circuit voltage) would also be acceptable. This is because when connecting the FC system 30 to the hybrid power supply system 100, as long as the terminal voltage of the secondary power supply system 20 rises, even without reaching the open circuit voltage, excessive current from the FC system 30 which is the fuel cell can be suppressed by the equivalent of the rise.

E-2. In the first embodiment, a design called flyback design or ON-OFF design is employed as the DC-DC converter, but it would be acceptable to employ, for example, a forward design or push-pull design. In the preceding embodiments, a DC-DC converter 21 that uses a transformer is used, but a DC-DC converter 21 that does not use a transformer would also be acceptable.

E-3. In the first embodiment, a diode D1 for countercurrent prevention is connected between the power supply wiring 12 and the FC system 30, but a switch that is ON-OFF controlled so as to prevent countercurrent would also be acceptable. In this case, the switch corresponds to the "countercurrent prevention device" in the claims.

E-4. In the second embodiment, the secondary cell is arranged so that when predetermined power (hypothetical maximum value of drive circuit requested power) is output, terminal voltage is equal to or greater than the terminal voltage when the fuel cell is open, but it could be arranged so that voltage is lower than this. This is because even with an arrangement in which it rises by means of the DC-DC converter, a specified control mode in which terminal voltage of a secondary power supply system is equal to or higher than the terminal voltage when the fuel cell is open can be realized. However, with an arrangement such as the former, there is the advantage that when the operating mode of the DC-DC converter is the short circuit mode, the specified control mode can be realized.

E-5. In the second embodiment, the secondary cell and the load or fuel cell are shorted by means of the ON-OFF combination of four switches Q1, Q2, Q3, Q4 used for step up or step down in the DC-DC converter, but the short circuit mode could be realized, for example, by disposing a shorting switch between the secondary cell and the fuel cell or load. However, if a short circuit mode is realized by means of the ON-OFF combination of four switches Q1, Q2, Q3, Q4, there is the advantage that the shorting switch may be dispensed with, and a highly reliable system realized easily.

INDUSTRIAL APPLICABILITY

This invention is applicable to power supply systems equipped with fuel cells.

The invention claimed is:

1. A power supply system for supplying electrical power to a load, comprising:
a power supply wiring for a connection to the load;
a fuel cell system including a fuel cell connectable to the power supply wiring;
a secondary power supply system connectable to the fuel cell via the power supply wiring;
a switch for opening and closing a connection between the fuel cell and the power supply wiring; and
a controller for controlling the secondary power supply system and the switch, wherein
the controller is configured to control the secondary power supply system to boost a terminal voltage of the secondary power supply system to a first voltage, when connecting the fuel cell to the power supply wiring, the first voltage being equal or higher than an open circuit voltage of the fuel cell, and the controller is configured to drop the terminal voltage of the secondary power supply system to a voltage lower than an electrical potential difference of the fuel cell, in response to isolation of the fuel cell from the power supply wiring by turning the switch off.

2. The power supply system according to claim 1, wherein the controller is configured to drop the terminal voltage of the secondary power supply system to a second voltage, after connecting the fuel cell to the power supply wiring, the second voltage being lower than an electrical potential difference of the fuel cell.

3. The power supply system according to claim 1, wherein the secondary power supply system comprises a rechargeable secondary cell, and a DC-DC converter able to boost or drop a voltage of DC input power input from the secondary cell, for outputting DC power; and
the controller is configured to initiate control so as to bring the output voltage of the DC-DC converter closer to the output voltage of the secondary cell than the electrical potential difference of the fuel cell, in response to isolation of the fuel cell from the power supply wiring.

4. The power supply system according to claim 1, wherein the secondary power supply system comprises a rechargeable secondary cell, and a DC-DC converter able to boost or drop a voltage of DC input power input from the secondary cell, for outputting DC power; and
the controller is configured to initiate control so as to bring the output voltage of the DC-DC converter close to the output voltage of the secondary cell, in response to isolation of the fuel cell from the power supply wiring.

5. The power supply system according to claim 1, wherein the controller is configured to isolate the fuel cell from the power supply wiring when the fuel cell is in a state of inability to supply a predetermined magnitude of electrical power.

6. A control apparatus for controlling a power supply system to provide electrical power to a load, wherein
the power supply system comprises:
a power supply wiring and for a connection to the load;
a fuel cell system including a fuel cell connectable to the power supply wiring;
a secondary power supply system connectable to the fuel cell via the power supply wiring;
a switch for opening and closing a connection between the fuel cell and the power supply wiring; and
the controller is configured to control the secondary power supply system to boost a terminal voltage of the secondary power supply system to a voltage equal to or higher than an open circuit voltage of the fuel cell when controlling the switch to connect the fuel cell to the power supply wiring, and the controller is configured to drop the terminal voltage of the secondary power supply system to a voltage lower than an electrical potential difference of the fuel cell, in response to isolation of the fuel cell from the power supply wiring by turning the switch off.

7. A method of providing electrical power to a load, comprising the steps of:
(a) providing a power supply wiring for a connection to the load, a fuel cell system including a fuel cell connectable to the power supply wiring, a secondary power supply system connectable to the fuel cell via the power supply wiring, a switch for opening and closing a connection between the fuel cell and the power supply wiring, and (b) controlling the secondary power supply system and the switch, wherein the step (b) includes the step of controlling the secondary power supply system to boost a terminal voltage of the secondary power supply system to a first voltage, when connecting the fuel cell to the power supply wiring, the first voltage being equal or higher than an electrical potential difference of the fuel cell, and the controller is configured to drop the terminal voltage of the secondary power supply system to a voltage lower than an electrical potential difference of the fuel cell, in response to isolation of the fuel cell from the power supply wiring by turning the switch off.

8. The power supply system of claim 1, further comprising a countercurrent prevention device connected between the fuel cell and the first power supply wiring.

9. The control apparatus of claim 6, wherein the power supply system further comprises a countercurrent prevention device connected between the fuel cell and the first power supply wiring.

\* \* \* \* \*

UNITED STATES PATENT AND TRADEMARK OFFICE
CERTIFICATE OF CORRECTION

PATENT NO. : 7,354,671 B2  Page 1 of 1
APPLICATION NO. : 11/151540
DATED : April 8, 2008
INVENTOR(S) : Tetsuhiro Ishikawa et al.

It is certified that error appears in the above-identified patent and that said Letters Patent is hereby corrected as shown below:

| Column | Line | |
|--------|------|---|
| 4 | 23 | Change "Relationship" to --relationship--. |
| 10 | 34 | Change "time till" to --time t11--. |
| 12 | 14 | Change "on as is" to --on as-is--. |
| 14 | 45 | After "wiring" delete "and". |

Signed and Sealed this

Twenty-third Day of June, 2009

JOHN DOLL
*Acting Director of the United States Patent and Trademark Office*